United States Patent
Masuda et al.

(10) Patent No.: US 6,792,266 B1
(45) Date of Patent: Sep. 14, 2004

(54) NETWORK TELEPHONE SYSTEM

(75) Inventors: Noboru Masuda, Kawasaki (JP);
Kenshi Kamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 09/699,767

(22) Filed: Oct. 30, 2000

(30) Foreign Application Priority Data

Mar. 21, 2000 (JP) ........................................ 2000-077568

(51) Int. Cl.⁷ ............................................ H04M 3/42
(52) U.S. Cl. ................... 455/417; 379/211.01
(58) Field of Search ..................... 455/414.1, 417; 379/88.11, 93.23, 93.35, 142, 215, 211.01; 370/259, 352, 354, 356, 389, 466

(56) References Cited

U.S. PATENT DOCUMENTS

| | | | | |
|---|---|---|---|---|
| 5,724,412 A | * | 3/1998 | Srinivasan | 379/93.23 |
| 5,805,587 A | * | 9/1998 | Norris et al. | 370/352 |
| 5,894,504 A | * | 4/1999 | Alfred et al. | 379/88.13 |
| 5,946,381 A | * | 8/1999 | Danne et al. | 379/142.07 |
| 6,005,870 A | * | 12/1999 | Leung et al. | 370/466 |
| 6,078,581 A | * | 6/2000 | Shtivelman et al. | 370/352 |
| 6,144,644 A | * | 11/2000 | Bajzath et al. | 370/259 |
| 6,317,488 B1 | * | 11/2001 | DePond et al. | 379/93.35 |
| 6,353,611 B1 | * | 3/2002 | Norris et al. | 370/356 |
| 6,493,445 B2 | * | 12/2002 | Garland et al. | 379/243 |

FOREIGN PATENT DOCUMENTS

JP          10-322462          12/1998

* cited by examiner

Primary Examiner—William Trost
Assistant Examiner—Stephen D'Agosta
(74) Attorney, Agent, or Firm—Katten Muchin Zavis Rosenman

(57) ABSTRACT

There is disclosed a network telephone system which registers subscriber information necessary to monitor a call upon a request for call transfer by a first subscriber who has made dial-up connection, notifies the first subscriber that there is an incoming call from a second subscriber, and makes a call setup for voice in accordance with an instruction from the first subscriber.

2 Claims, 19 Drawing Sheets

NETWORK TELEPHONE SYSTEM

BACKGROUND OF THE INVENTION

The present invention relates to a network telephone system for replying to a phone call to a subscriber which originates from another subscriber while the subscriber is communicating via a network such as Internet using a phone line.

There are listed below some abbreviations for use in this specification, which are typically used in the communications field. These abbreviations are suitably utilized for explanation throughout this specification.

PC . . . Personal Computer
ICW . . . Internet Call Waiting
IP . . . Internet Protocol
PSTN . . . Public Switched Telephone Network
TN . . . Telephone Network
LS . . . Local Switch
ISP . . . Internet Service Provider
GW . . . Gateway
CA . . . Call Agent
AS . . . Access Server
STP . . . Signal Transport Point
SCP . . . Service Control Point
DHCP . . . Dynamic Host Configuration Protocol
QoS . . . Quality of Service
DNS . . . Domain Name System
WWW . . . World Wide Web
FTP . . . File Transfer Protocol
URL . . . Uniform Resource Locator
IAM . . . Initial Address Message Recently, a greater number of users receive a variety of services by using dial-up connection via a modem from a PC (Personal Computer). One of the services is an ICW (Internet Call Waiting) service. The ICW service is a service in which when a subscriber A receives a phone call from another subscriber B while being in dial-up connection to the Internet, the subscriber A is notified that there is an incoming call from the subscriber B via the Internet using IP packets, instead of sending an audible signal to subscriber via the phone line, and if the subscriber A replies, the connection for the call is established via the Internet.

FIG. 20 is a block diagram schematically showing a network for providing the conventional ICW service. FIG. 21 is a diagram showing a procedure of the conventional ICW service from the time when the subscriber A makes dial-up connection to the Internet to the time when starting conversation with another subscriber B.

Firstly, the subscriber A makes a call to an AS (Access Server) of an ISP (Internet Service Provider) of which the subscriber A is a member to effect dial-up connection, and log in a network for the ISP. Thereby, an IP (Internet Protocol) address from the ISP is assigned to the subscriber A.

Next, the ISP registers the IP address assigned to the subscriber A in an ICW server operated by the ISP. Also, the ISP makes a setup to transfer a phone call to the subscriber A who is in connection to the Internet to the ICW server. For example, the ISP makes a setup to call a specific telephone number which is prepared for a call transfer request, and transfer phone calls to the subscriber A to the ICW server. Thereafter, a call transfer process is performed automatically through a common channel signaling network.

In this way, after the ICW server has made various setups, if the subscriber B makes a call to the subscriber A who is connecting to the Internet, the call to the subscriber A is transferred to the ICW server under the control of the common channel signaling network. Then, the ICW server sends a message in IP packets notifying that there is an incoming call to the subscriber A via the Internet, using the registered IP address of the subscriber A. This message includes several choices which the subscriber A can select, and a message screen containing these choices is displayed on a screen of the PC operated by the subscriber A. For example, a message screen containing the choices such as "a. Take a call," "b. Reject," "c. Transfer" and "d. Save as a voice mail" is displayed.

The subscriber A takes a desired choice from among a plurality of choices contained in this message screen. For example, if the subscriber A makes a choice "a. Take a call," the ICW server connects a call transferred from the subscriber B via the Internet to the subscriber A. Thereafter, the subscriber B can talk with the subscriber A via the IP network.

As the prior art for notifying or transferring a phone call from the subscriber B to the subscriber A, "Network Telephone System" as disclosed in Japanese Patent Laid-Open No. 10-322462 is well known.

By the way, the conventional ICW service described in the above had the following three problems.

A first problem is that since the conventional ICW service is one of the services provided by the ISP to which subscriber A has subscribed, the subscriber desiring an ICW service is necessary to connect via an ISP providing this ICW service to the Internet. This means that when the subscriber connects via other ISP to the Internet, the subscriber can not receive the ICW service. For example, an ICW service of an ISP to which the subscriber A has subscribed is enabled by registering an IP address of the subscriber to an ICW server corresponding to this ISP, but the registration process to the ICW server provided in the specific ISP can not be effected, when the subscriber connects via the other ISP to the Internet. Accordingly, when the subscriber A connects via the ISP not applied for the use of the ICW service or the ISP not practicing the ISP service to the Internet, the subscriber A can not use the ICW service.

A second problem is that if the subscriber A has a phone call from another subscriber B while the subscriber A is connecting to the Internet, the call is all transferred to the ICW server, and therefore even if the call is thereafter connected via the Internet, the service charge may not become cheap in some cases. For example, suppose that there are a number of access points to an ISP across the nation, to which the subscriber A living in Nagoya has subscribed, an ICW server corresponding to this ISP is located in Tokyo. If the subscriber A has a phone call from the subscriber B who lives in Osaka while the subscriber A is connecting via an access point of Nagoya where the subscriber A lives to the Internet, the call from the subscriber B is once transferred to the ICW server in Tokyo. Therefore, if the subscriber A and the subscriber B subsequently make communication via the Internet, it follows that the subscriber B makes the long distance call to Tokyo, so that the telephone charge is more expensive than when directly calling the subscriber A in Nagoya without the Internet.

A third problem is that the link to the conventional PSTN (Public Switched Telephone Network) is difficult to make. When the subscriber A takes a call from the subscriber B while connecting to the Internet, the subscriber A is connected via the Internet at any time, and can not talk via the PSTN only. Particularly, the Internet has unstable quality of speech because the traffic is burst. Accordingly, for an important matter, the subscriber may want to talk by connecting the line not via the Internet, but only via the public switched telephone network which is conventionally provided. However, with the conventional ICW service, the link to the PSTN is difficult. Therefore, when the subscriber wanted to talk via the PSTN, the subscriber A once disconnected dial-up connection to the Internet, and then one of the subscribers A, B needed to call the other person again, which took much time and labor.

SUMMARY OF THE INVENTION

The present invention has been achieved in the light of these respects, and it is an object of the invention to provide a network telephone system which allows the use of a telephone service via the Internet, irrespective of whichever ISP may be used or without making dial-up connection (in this case, replying way is only via the IP network). It is another object of the invention to provide a network telephone system which can reduce the charge for telephone call when the subscriber makes communication via the Internet. Further, it is a further object of the invention to provide a network telephone system which can readily establish the link to the conventional PSTN.

A network telephone system of the invention comprises service providing unit for providing a predetermined service via a predetermined network to a first subscriber who has made dial-up connection, subscriber information registration unit for registering subscriber information necessary to monitor a call to this first subscriber who has made dial-up connection to the Internet, incoming call detection unit for detecting that there is an incoming call from a second subscriber to the first subscriber who is accessing an IP network such as the Internet via a dial-up connection to the service providing unit by monitoring a call incoming to the first subscriber on the basis of the subscriber information registered in the subscriber information registration unit, incoming call notification unit for notifying the first subscriber that the incoming call has been detected by the incoming call detection unit, and call control unit for controlling the call setup for voice between the first subscriber and the second subscriber, upon an instruction from the first subscriber who has received a notification by the incoming call notification unit. In this way, since a registration process for the subscriber information by the subscriber information registration unit is performed to a telephone service carrier upon a request from the first subscriber desiring the call to be transfer via IP network, the registration process can be effected, even if the first subscriber who has issued this request uses any Internet service provider, so that an incoming call from the second subscriber can be transferred to the first subscriber.

The subscriber information includes a regular subscriber's number which is given to the first subscriber in advance by the telephone service carrier, and IP address which is assigned by the Internet service provider. Usually, the subscriber gets different IP address from the ISP at every time of dial-up connection. Desirably, the incoming call detection unit monitors an incoming call originated from telephone network to the subscriber's number corresponding to the first subscriber by monitoring the call set-up messages (such as IAM) received from the common channel signaling network, and the incoming call notification unit notifies the first subscriber designated by the IP address associated with the registered phone number. In this way, using the subscriber's number (e.g., telephone number), an incoming call to the first subscriber from the second subscriber can be discriminated. Using the IP address which is registered in the information registration unit at every time of dial-up connection, it is possible to notify the first subscriber who is receiving some service from service providing unit through the dial-up connection that there is an incoming call from the second subscriber.

A terminal unit for the first subscriber desirably includes registration request unit for requesting the registration by sending the subscriber information to the subscriber information registration unit. Since using the terminal unit for the first subscriber having the registration request unit, the subscriber information necessary for registration is transmitted from this registration request unit, the subscriber information registration unit get subscriber's address regardless of what method the subscriber access the IP network and not depending on which ISP the subscriber subscribed.

The network is preferably configured to include a first network accommodating the lines for the first and second subscribers and having a service quality which does not vary depending on the traffic volume and the number of hops in the path between the two subscribers with respect to the voice, a second network having a service quality which varies depending on the traffic volume with respect to the voice but the communication charge in the second network is pretty lower than the communication charge in the first network, and a plurality of protocol conversion unit, installed at a plurality of sites, for converting the protocol between the first and second networks. In this case, the call control unit desirably makes a call setup via the first and second networks. Since a voice signal on the first network which is transmitted from the second subscriber can be converted into a voice signal on the second network, using protocol conversion unit, it is possible to transfer a call from the second subscriber via the second network, while the first subscriber is accessing the second network using various kinds of services provided by service providing unit via the first network.

Also, the call control unit desirably designates the protocol conversion unit available which is located near the residential place of the second subscriber, and makes a call setup between the first subscriber and the second subscriber via this designated protocol conversion unit. Since the protocol conversion unit located near the residential place of the second subscriber is used, the communication charge can be reduced in the case where the communication charge is imposed in proportion to the distance between the first subscriber and the protocol conversion unit.

The call control unit desirably designates the protocol conversion unit near the residential place of the second subscriber, based on the second subscriber's number which is included in the IAM message from common channel signaling network. The subscriber's number having an area code can be used to readily discriminate the residential place of the subscriber, because a part of the subscriber's number corresponds to the residential place of the subscriber.

The first network includes a common channel signaling network for controlling the call, and each of the incoming call detection unit and the call control unit is preferably connected to the signaling network. The use of the common channel signaling network facilitates an operation of detecting an incoming call to the first subscriber which is performed by the incoming call detection unit. Also, the call setup operation by the call control unit can be facilitated by instructing a call connection via the signaling network.

Preferably, the first network is a public switched telephone network, and the second network is an IP network including a public Internet. When the second subscriber makes a phone call to the first subscriber via the public switched telephone network while the first subscriber is connected to the Internet via a dial-up connection, the call from the second subscriber can be connected via the Internet to the first subscriber. As a result, the communication charge can be reduced, and the first subscriber has no need of providing extra telephone line to reply to a telephone call from the second subscriber when using the Internet.

The call control unit preferably makes connection between the first subscriber and the second subscriber, using a call via the first network but not via the second network, waiting for the first subscriber line which has been used in the dial-up connection to be released, when the first subscriber instructs a call setup not via the second network. Since the link between the first and second networks can be readily established, the first network with stable quality can be selected to reply, rather than the second network with less stable service quality (speech quality), thereby allowing the subscriber to reduce the time and labor.

The subscriber information registration unit preferably transmits a predetermined message to the first subscriber to monitor a response to the message, and when there is no response, deletes the subscriber information for the first subscriber from the registration to make the call transfer request invalid. Though the communication may be interrupted for some cause, the interrupted state of communication can be detected by investigating the presence or absence of a message transmission and a response, and an unnecessary call transfer request from the subscriber can be made invalid, so that the network resource can be effectively utilized.

The call connection unit (incoming call detection unit) preferably makes a call waiting service invalid temporarily prior to a call monitoring operation, when the first subscriber is a user of call waiting service. In the case where the call waiting service is used, a local telephone switch transmits a special audio signal to the first subscriber, when the first subscriber has a phone call from the second subscriber. In this case, the communication between service providing unit and the first subscriber who has made dial-up connection may be interrupted due to this special signal. Therefore, such interruption of communication can be avoided by making the call waiting service invalid in advance.

DESCRIPTION OF THE PREFERRED EMBODIMENT

A network telephone system according to one embodiment of the present invention will be described below with reference to drawings.

Figure 1:
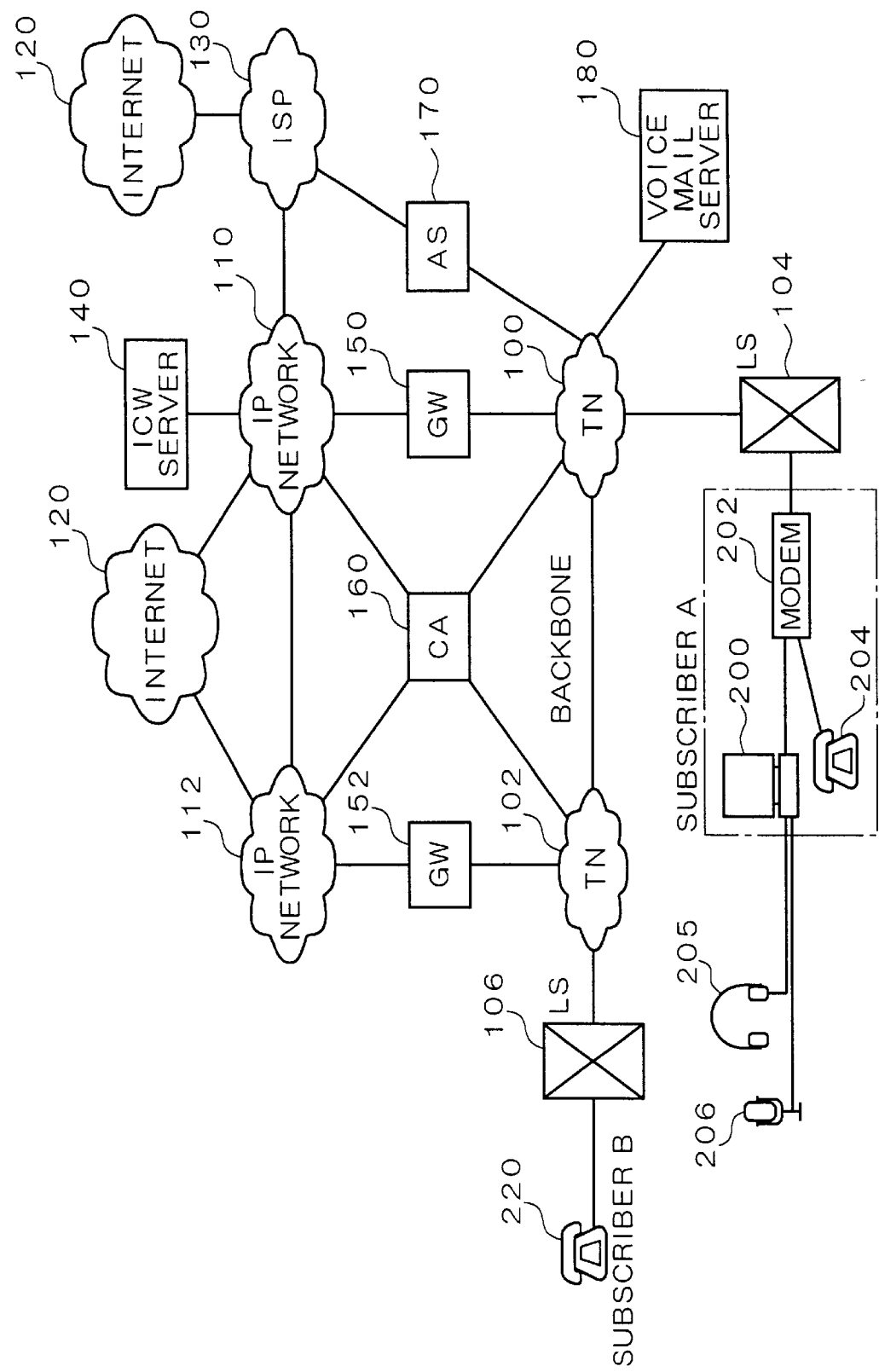
FIG. 1 is a schematic block diagram showing a network including a network telephone system according to one embodiment of the present invention.

FIG. 1 is a block diagram schematically showing the configuration of a network telephone system according to one embodiment of the invention. A network as shown in FIG. 1 comprises TNs (Telephone Network) 100, 102, LSs (Local Switch) 104, 106, IP networks 110, 112, a public Internet 120, an ISP 130, an ICW server 140, GW (Gateway)s 150, 152, a CA (Call Agent) 160, an AS (Access Server) 170, and a voice mail server 180.

TNs 100, 102 interconnect the telephone lines of subscribers by switching a plurality of subscriber lines which are accommodated by the LS 104, 106 or other LS. TNs 100, 102 are connected through a large capacity of backbone line (trunkline) to form a nationwide PSTN. IP networks 110, 112 are IP based networks which are operated by the telecommunications carriers, for example, in which several levels of QoS are assured in accordance with the kind of service, and the IP network is distinguished from the public Internet 120.

The ISP 130 has various types of servers and provides various types of services to the subscrivers, including the WWW (World Wide Web) server, a mail server, a DNS (Domain Name System) server, a news server, and an FTP (File Transfer Protocol) server. The line connection from the subscriber to the ISP 130 is typically effected by the dial-up connection. For example, a subscriber A in Tokyo calls any access point (or typically an access point nearest the subscriber A) of the ISP 130 to make dial-up connection to the AS 170, and thereby establish the line connection to the ISP 130.

The ICW server 140 is a unit intended to provide for the ICW service, and may be implemented on a platform for the computer such as a work station or PC. This ICW server 140 registers an IP address of the subscriber upon a request from the subscriber. Also, the ICW server 140, when notified from the CA 160 that the registered subscriber has a phone call, presents a plurality of choices to that subscriber to notify the phone call, and transfers its result of choice to the CA 160, when the subscriber makes any choice.

Figure 2:
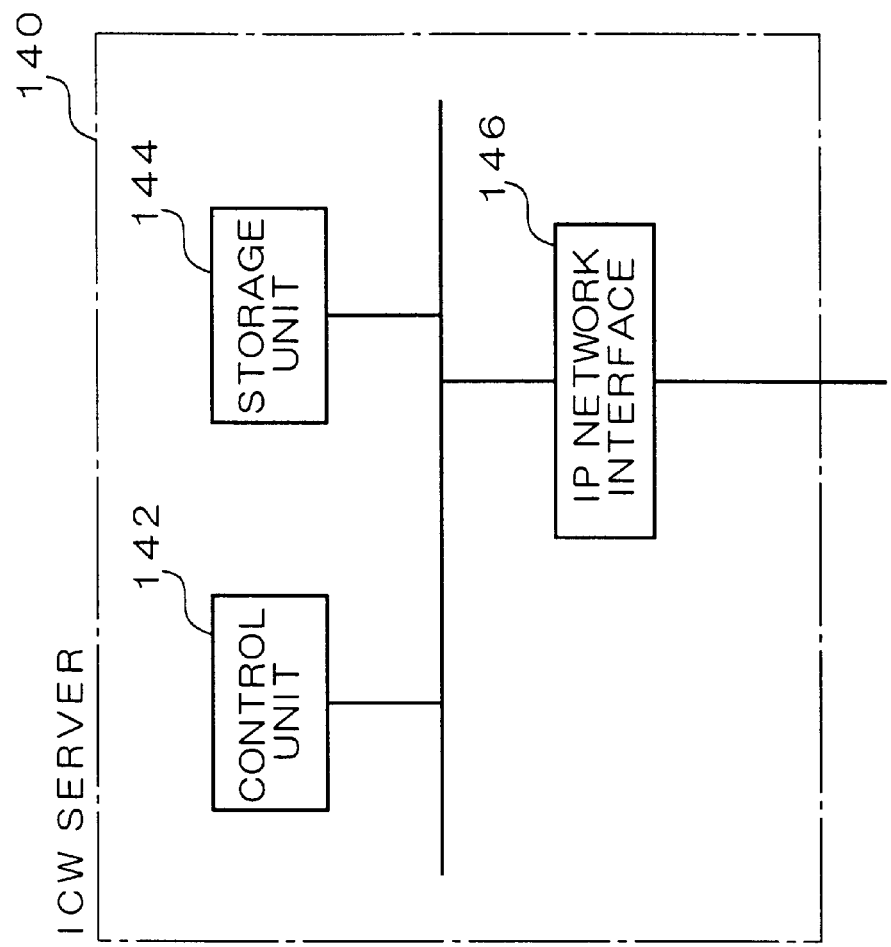
FIG. 2 is a diagram showing a configuration of an ICW server.

FIG. 2 is a diagram showing the configuration of the ICW server 140. As shown in FIG. 2, the ICW server 140 is configured to include a control unit 142, a storage unit 144, and an IP network interface 146.

The control unit 142 controls the overall operation of the ICW server 140 in accordance with a program or various kinds of information stored in the storage unit 144. The information stored in the storage unit 144 includes the information regarding each subscriber necessary to provide an ICW service. This subscriber information includes at least an ID for ICW service (e.g., telephone number) and a password of the subscriber, and an IP address sent from the subscriber when making a request of registration. The ID and password are used to authenticate the subscriber who has requested the registration to be an interested person for the ICW service, and stored in the storage unit 144 as the permanent information. On the contrary, the IP address is given from the ISP 130 every time the subscriber makes dial-up connection to the ISP 130, and performs a log-in operation, whereby the IP address sent from the subscriber in requesting the registration is stored in the storage unit 144 at every time.

The IP network interface 146 is used for the ICW server 140 to communicate via the IP network 110 with the CA 160 or the subscriber. The ICW server 140 is connected via this IP network interface 146 to the IP network (or to the IP network 110 in FIG. 1).

The GW 150 is to make mutual conversion between the voice signal and the IP packet. Namely, the GW 150 converts a voice signal sent from the TN 100 into the IP packet to be transferred to the IP network 110, as well as converting the IP packet corresponding to the voice that is transmitted from the IP network 100 into a voice signal to be transferred to the TN 100.

Figure 3:
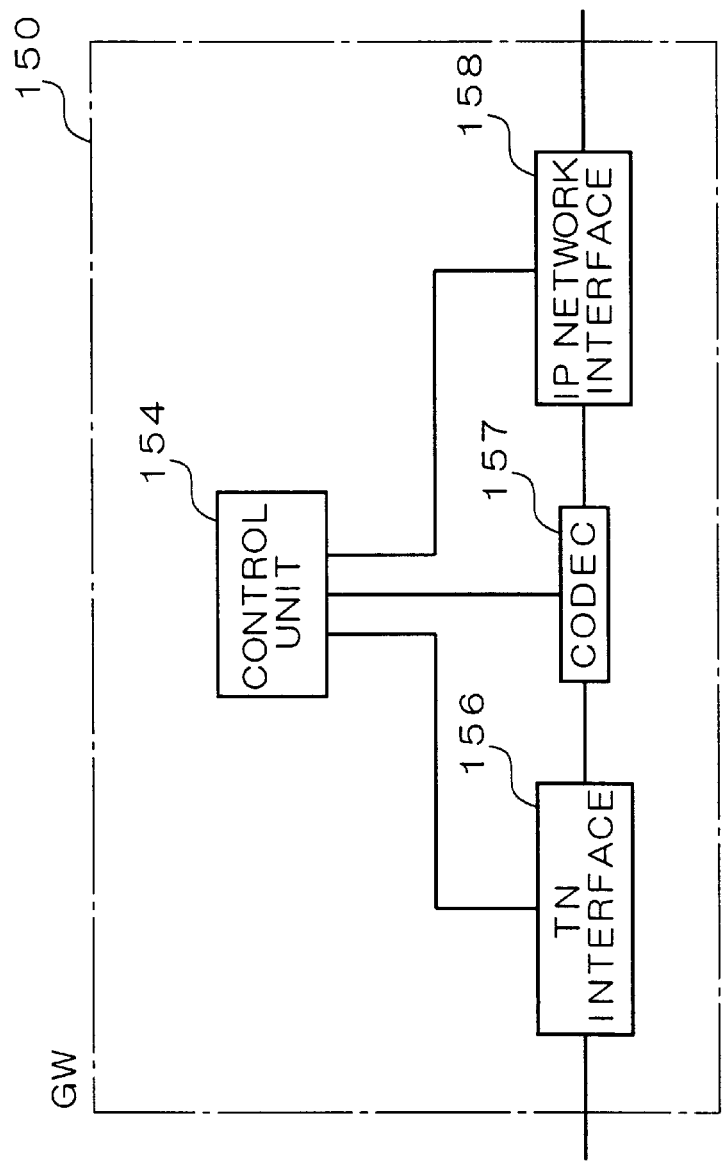
FIG. 3 is a diagram showing a configuration of a GW.

FIG. 3 is a diagram showing the configuration of the GW 150. As shown in FIG. 3, the GW 150 is configured to include a control unit 154, a TN interface 156, a CODEC 157, and an IP network interface 158.

The control unit 154 controls the overall operation of the GW 150. The TN interface 156 inputs or outputs the voice signal from or to the TN 100. For example, T1 (24ch) interface is used in Japan, or E1 (30ch) interface is used in Europe. The CODEC 157 performs an encoding process for encoding a basic digital signal (which is sampling of the voice at a frequency of 8 KHz) into a high efficient digital signal and encapsulates the high efficient digital signals into IP packets. Decoding process, which is a reverse process to the encoding process, is also performed by CODEC 157. For example, it performs a process as defined in the G series of ITU-T (G. 729a, G. 729b or G. 723.1 etc.). The IP network interface 158 is one for inputting or outputting the IP packet corresponding to the voice from or to the IP network 110, or a signal packet for communication with the CA 160. For example, the Ethernet interface or ATM interface is used. Other GW 152 has the same configuration, and is not described in detail here.

The CA 160 is used for controlling a call connection through a network environment where a packet network such as an IP network is included (110, 112 and the Internet 120), and is usually configured on a platform for the computer such as a work station or the like.

Generally, a call passed only via the PSTN can be controlled through an existing common channel signaling network (e.g., a No. 7 common channel signaling network) alone, but if any network other than the PSTN, e.g., an IP network, is included in the call connection path, a specific device is needed to control this network. This device is a CA 160 in this embodiment.

Figure 4:
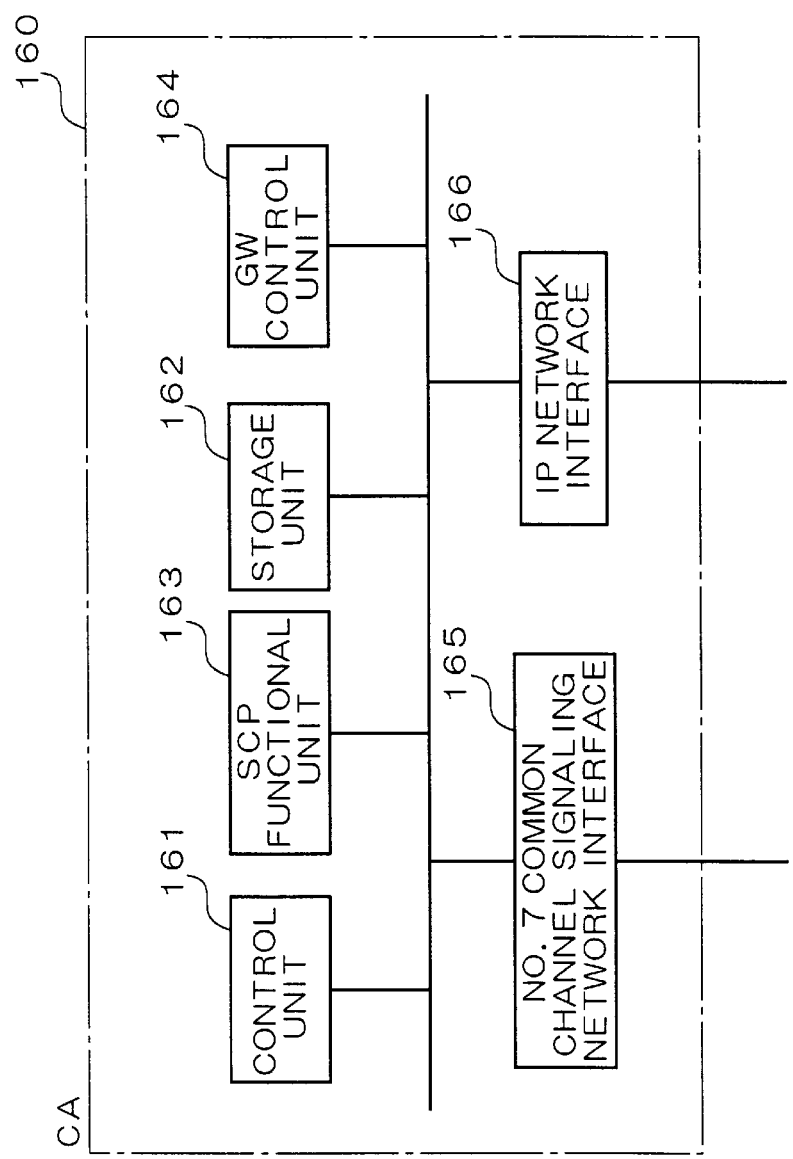
FIG. 4 is a diagram showing a configuration of a CA.

FIG. 4 is a diagram showing the configuration of the CA 160. As shown in FIG. 4, the CA 160 is configured to include a control unit 161, a storage unit 162, an SCP functional unit 163, a GW control unit 164, a No. 7 common channel signaling network interface 165, and an IP network interface 166.

The control unit 161 controls the overall operation of the CA 160, in accordance with a program or various kinds of information stored in the storage unit 162. The storage unit 162 stores a program necessary to make a call connection, subscriber information, and network information. The SCP functional unit 163 has a function as the SCP of the No. 7 common channel signaling network included in the TN 100, 102, to monitor the call or control the connection in the TN 100, 102. The GW control unit 164 controls the GW 150, 152 to connect the phone call via the IP network (110, 112, and Internet 120). The No. 7 common channel signaling network interface 165 terminates a No.7 common channel (SS7) signal. The IP network interface 166 is to connect the CA 160 to the IP network 110, 112. The control of the GW 150, 152 or the communication with the ICW server 140 is effected via this IP network interface 166.

The above-described ISP 130 corresponds to the service providing unit; the ICW server 140 corresponds to subscriber information registration unit and incoming call notification unit; the CA 160 corresponds to incoming call detection unit and call control unit; and the PC 200 of the subscriber A corresponds to a terminal unit and registration requesting unit; the GW 150 and 152 responds to the protocol conversion unit.

A network in which the network telephone system of this embodiment is included has the above-described configuration. The operation of the network telephone system will be described below.

Overall Operation of ICW Service

Figure 5:
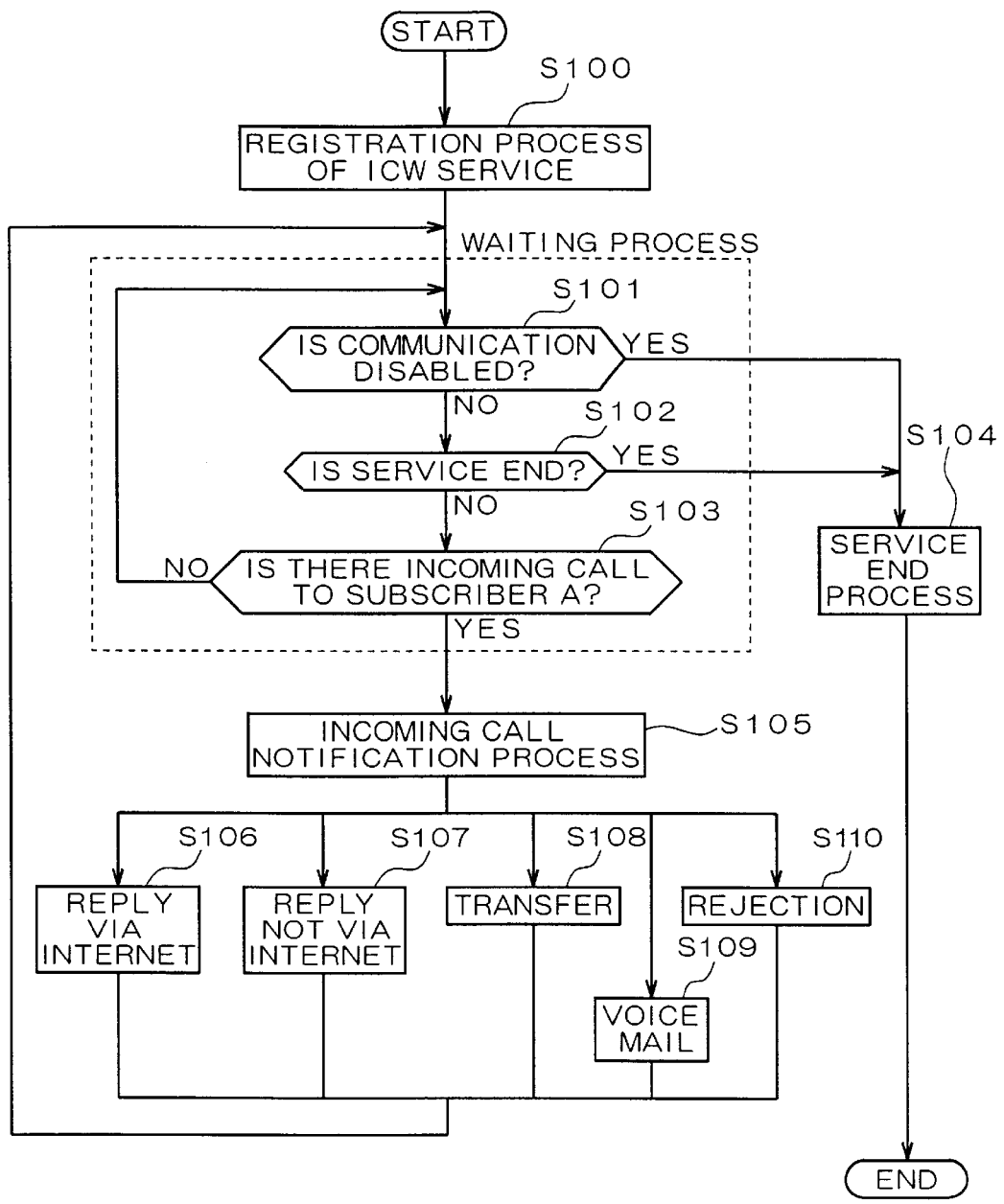
FIG. 5 is a flowchart showing an overall operation of a network telephone system according to this embodiment of the invention.
Figure 6:
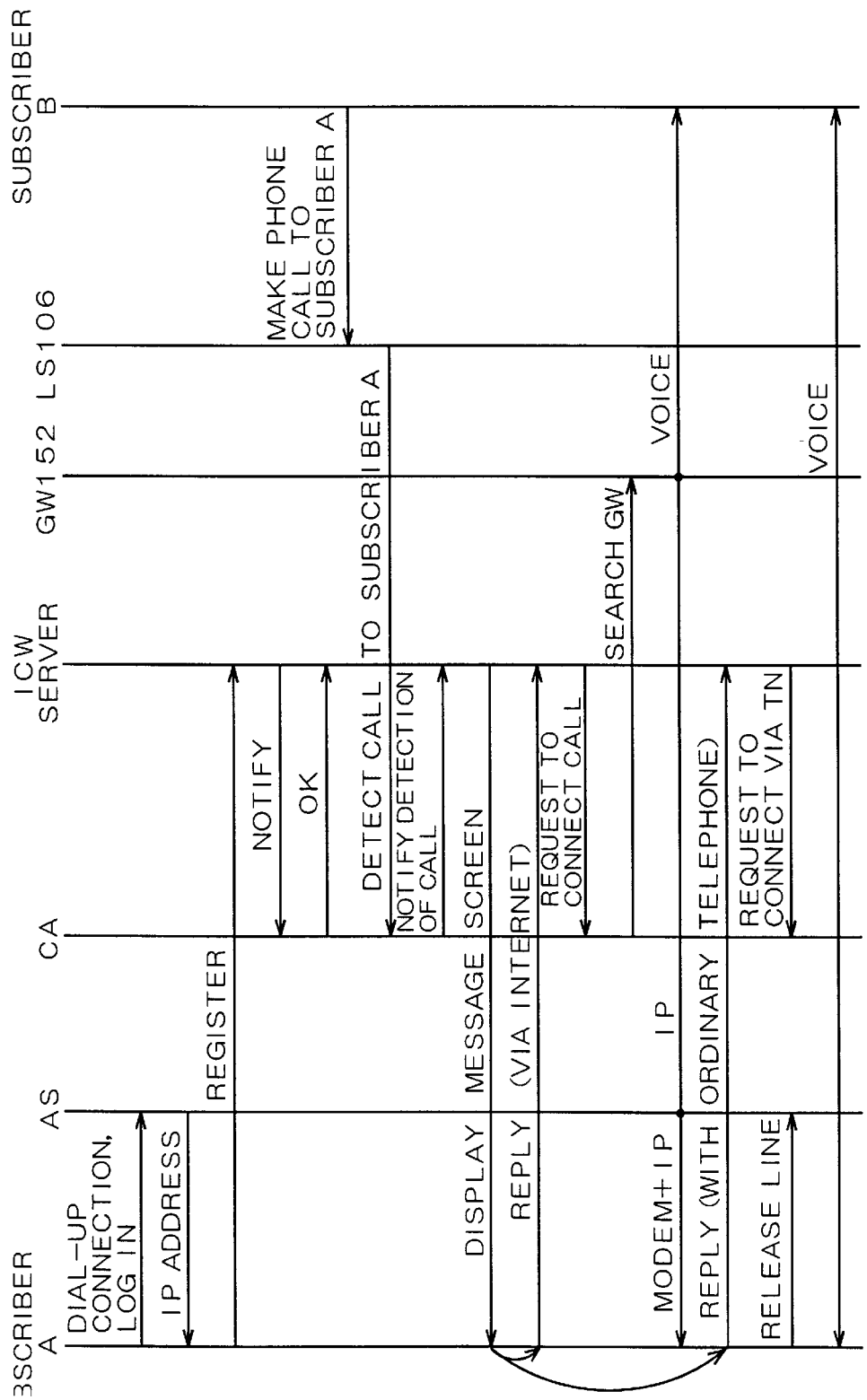
FIG. 6 is a chart showing an operation sequence of the network telephone system according to this embodiment of the invention.

FIG. 5 is a flowchart showing the overall operation of a network telephone system according to this embodiment of the invention. FIG. 6 is a chart showing the operation sequence of this network telephone system. For example, it is supposed that the subscriber A who is making use of various kinds of services by connecting to the Internet via a dial-up connection has a call from another subscriber B, to describe the operation procedure.

First, a registration process of an ICW service is performed (step S100). This registration process is performed on each side of the ICW server 140 and the PC 200 of the subscriber A. More specifically, the PC 200 of the subscriber A effects the registration process by sending an IP address to the ICW server 140, the IP address being given by the ISP when the subscriber A makes dial-up connection to the ISP 130 and logs in to use the Internet 120. Also, the ICW server 140 effect the registration process by storing the IP address sent from the PC 200 and various kinds of information necessary to provide the ICW service, and requesting the CA 160 to monitor an incoming call to the subscriber A.

If the registration process is ended, the routine transfers to a waiting process. This waiting process comprises a communication disabled determination (step S101), a service end determination (step S102) and an incoming call determination for the subscriber A (step S103). The communication disabled determination at step S101 is made in such a way that the PC 200 for the subscriber A checks whether or not a connection confirmation message transmitted from the ICW server 140 has been normally received, and the ICW server 140 checks whether or not a response to the connection confirmation message from the PC 200 has been normally received.

The service end determination at step S102 is made in such a way that the PC 200 checks whether or not the subscriber A has performed an end operation (e.g., an operation of ending the dial-up connection to the ISP 130 or an operation of ending the execution of a program necessary to accept the ICW service), and checks whether or not the ICW server 140 has received a request of service end transmitted from the PC 200.

The incoming call determination for the subscriber A at step S103 is made in such a way that the CA 160 monitors the presence or absence of a phone call to the subscriber A from another subscriber by checking the call setup request messages received from the common channel signaling network. The CA 160 checks whether or not the subscriber A uses a call waiting service provided by the telephone service carrier, before starting this monitor operation, and if the subscriber A uses the call waiting service, performs a process of making the call waiting service invalid temporarily until the ICW service is ended. Thereby, it is possible to prevent a specific signal generated by the call waiting service from being transmitted to the subscriber A.

If the communication disabled or the end of ICW service is determined, a predetermined service end process is performed (step S104). This service end process is performed at each of the ICW server 140, the PC 200 and the CA 160.

When there is an incoming call to the subscriber A, a predetermined incoming call notification process is performed (step S105). This incoming call notification process is performed by transmitting, from the ICW server 140 to the PC 200, a message that there was the incoming call to the subscriber A, and a message screen containing a plurality of choices corresponding to the operations which the subscriber A can select. For example, five choices include (1) Reply via the Internet, (2) Reply not via the Internet, (3) Transfer, (4) Use the voice mail function, and (5) Reject. If the subscriber A selects any one of the choices, the process (steps S106 to S110) corresponding to each operation is practiced, and the routine returns to the waiting process (steps S101 to S103).

Each sub-process included in the overall operation of the ICW service will be described below in detail.

Registration Process of ICW Service

Figure 7:
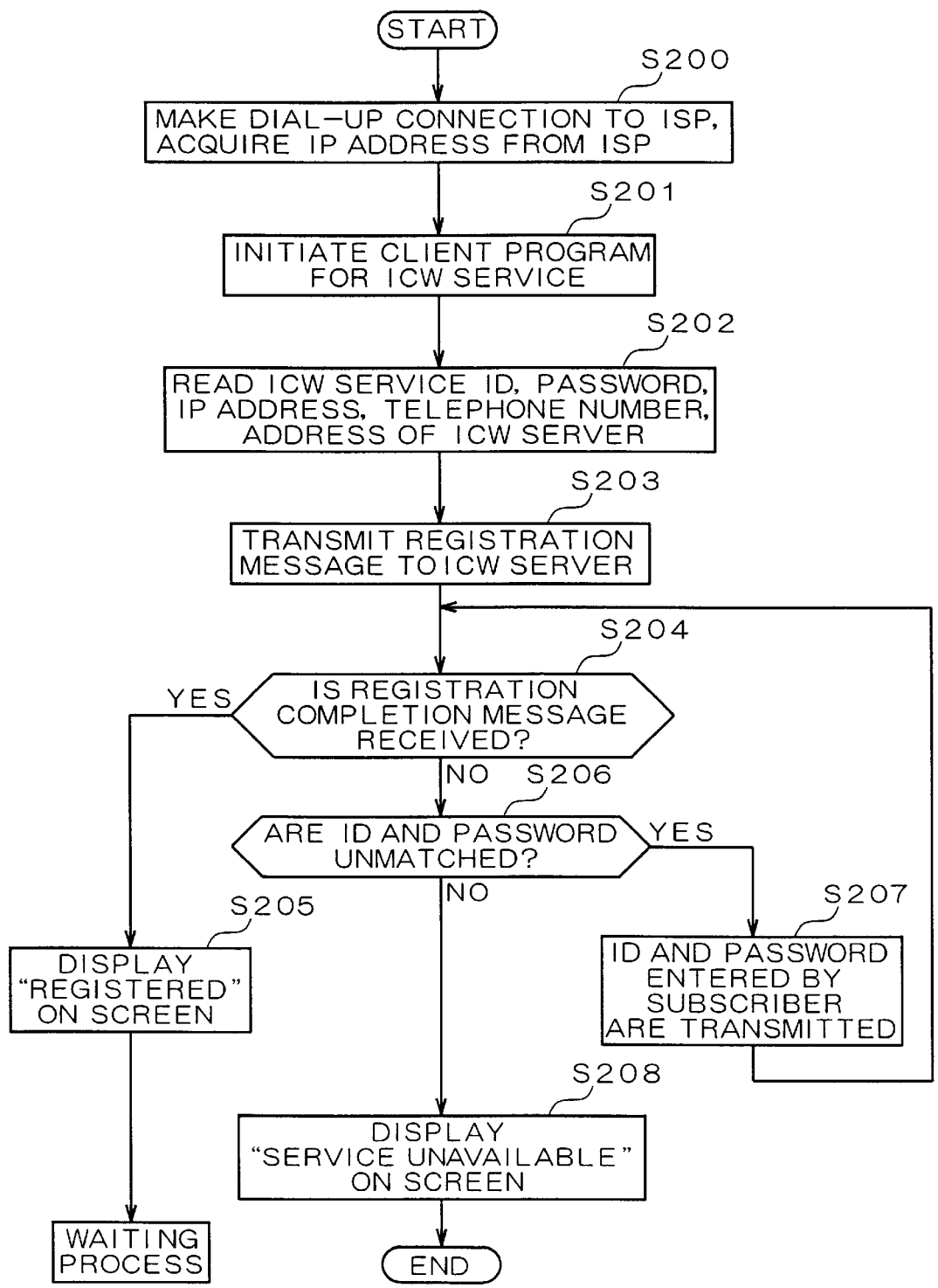
FIG. 7 is a flowchart showing an operation procedure of a registration process of an ICW service at a PC 200 for a subscriber A.

FIG. 7 is a flowchart showing the operation procedure of a registration process of the ICW service at the PC 200 of the subscriber A. First, the PC 200 make dial-up connection to the AS 170, using a modem 202, and logs in the ISP 130, to acquire an IP address from the ISP 130 (step S200).

Then, the PC 200 initiates a client program for the ICW service (step S201), and reads various kinds of information necessary for the subscriber A to accept the ICW service from an internal storage unit (not shown) (step S202). The various kinds of information includes an ICW service ID for the subscriber A, a password, the IP address acquired at step S200, a telephone number as a subscriber's number of the subscriber A, and an IP address of the ICW server 140.

Next, the PC 200 creates a registration message containing various kinds of information that has been read in, and transmits this message to the ICW server 140 using the IP address of ICW server (step S203). Thereafter, a determination is made whether or not a registration completion message has been received from the ICW server 140 (step S204). When the registration completion message has been received, an affirmative determination is made. Then the PC 200 displays a message window containing a character string "Registered" on a part of the screen (step S205). Then the routine transfers to the waiting process.

When no registration completion message has not been transmitted from the ICW server 140, the PC 200 makes a determination whether or not the ID for ICW service and the password are unmatched with the normal ones (step S206). For example, in this embodiment, there are following three cases where the registration completion message is not transmitted; i.e., when the ID for ICW service or the password are unmatched, and an unmatched notification is transmitted from the ICW server 140, when an error message is transmitted from the ICW server 140, or when no response is returned from the ICW server 140. When an unmatched notification is transmitted from the ICW server 140, an affirmative determination is made at step S206. Then the PC 200 waits for the subscriber A to enter an ID for ICW service and a password, and transfers the input information to the ICW server 140 again (step S207). The routine returns to step S204 to determine the reception of a registration completion message. On the other hand, when an error message is transmitted from the ICW server 140, or when no response is returned from the ICW server 140, a negative determination is made at step S206. Then the PC 200 displays a message window containing a character string "Service unavailable" on a part of the screen (step S208). Then the process on the side of the subscriber A regarding the ICW service is ended.

Figure 8:
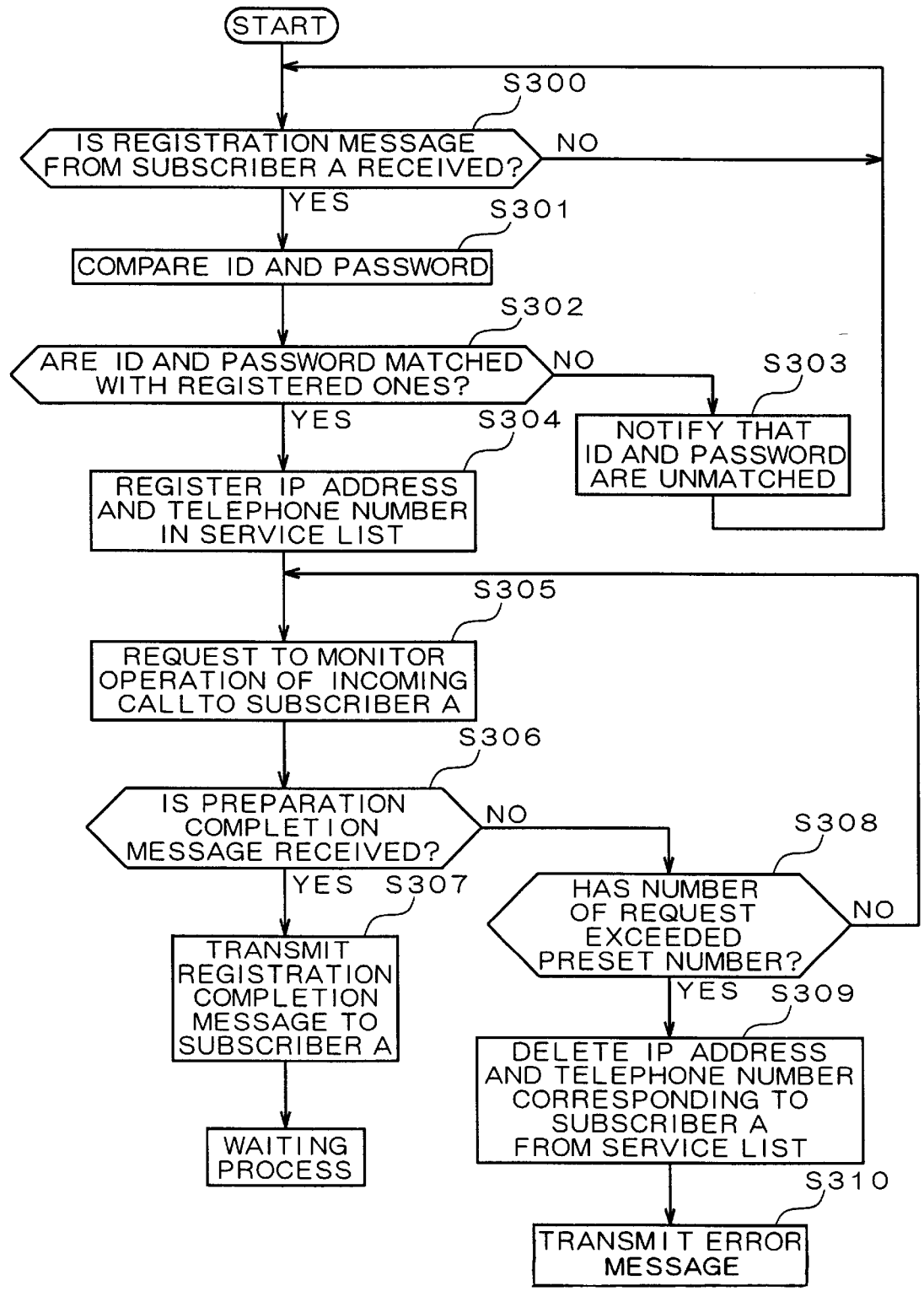
FIG. 8 is a flowchart showing the operation procedure of the registration process of the ICW service in the ICW server.

FIG. 8 is a flowchart showing the operation procedure of a registration process of the ICW service on the ICW server 140. The control unit 142 within the ICW server 140 makes a determination whether or not a registration message from the subscriber A has been received (step S300). The operation is placed in a reception waiting state until this registration message is received. If the registration message transmitted from the PC 200 of the subscriber A is received via the IP network interface 146, the control unit 142 make a comparison between the ID for ICW service and the password contained in this message and the ID for ICW service and the password for the subscriber A stored in the storage unit 144 (step S301), and makes a determination whether or not they are matched (step S302). If unmatched, a negative determination is made, and the control unit 142 transmits a notification that the ID for ICW service and the password are unmatched with the normal ones via the IP network interface 146 (step S303). Thereafter, the operation is placed in a reception waiting state at step S300.

If the ID for ICW service and the password contained in the received registration message are matched with the ID for ICW service and the password stored in the storage unit 144, an affirmative determination is made at step S302. Then the control unit 142 performs the registration process of various kinds of information regarding the subscriber A (step S304). More specifically, the IP address and the telephone number of the subscriber A contained in the received registration message are registered in a service list. This service list is a list of the subscribers for whom ICW service is being provided, in which the telephone number for use to designate the subscriber A on the telephone network (TN 100, 102) and the IP address for use to designate the subscriber A on the IP network (110, 112, and Internet 120) are added to the service list.

Next, the control unit 142 requests the CA 160 to monitor the operation of an incoming call to the subscriber A (step S306). Then the control unit 142 makes a determination whether or not a preparation completion message has been received from the CA 160 (step S305). If this message has been received, an affirmative determination is made. The control unit 142 transmits a registration completion message to the subscriber A (step S307). Thereafter, the operation is placed in a waiting process.

If the preparation completion message is not transmitted from the CA 160, a negative determination is made at step S306. Then the control unit 142 makes a determination whether or not the number of requests performed at step S305 has exceeded a preset number (e.g., five times) (step S308). If not exceeded, this request process is repeated until this preset number is exceeded. Furthermore, even if more number of the request process than the preset number is repeated, in the case when no preparation completion message is returned from the subscriber A, a negative determination is made at step S308. Then the control unit 142 deletes the IP address and the telephone number corresponding to the subscriber A from the service list stored in the storage unit 144 (step S309), and transmits an error message to the subscriber A (step S310).

Waiting Process in the ICW Service

A communication disabled determination process (operation of step S101 in FIG. 5) included in awaiting process for the ICW service will be described below.

Figure 9:
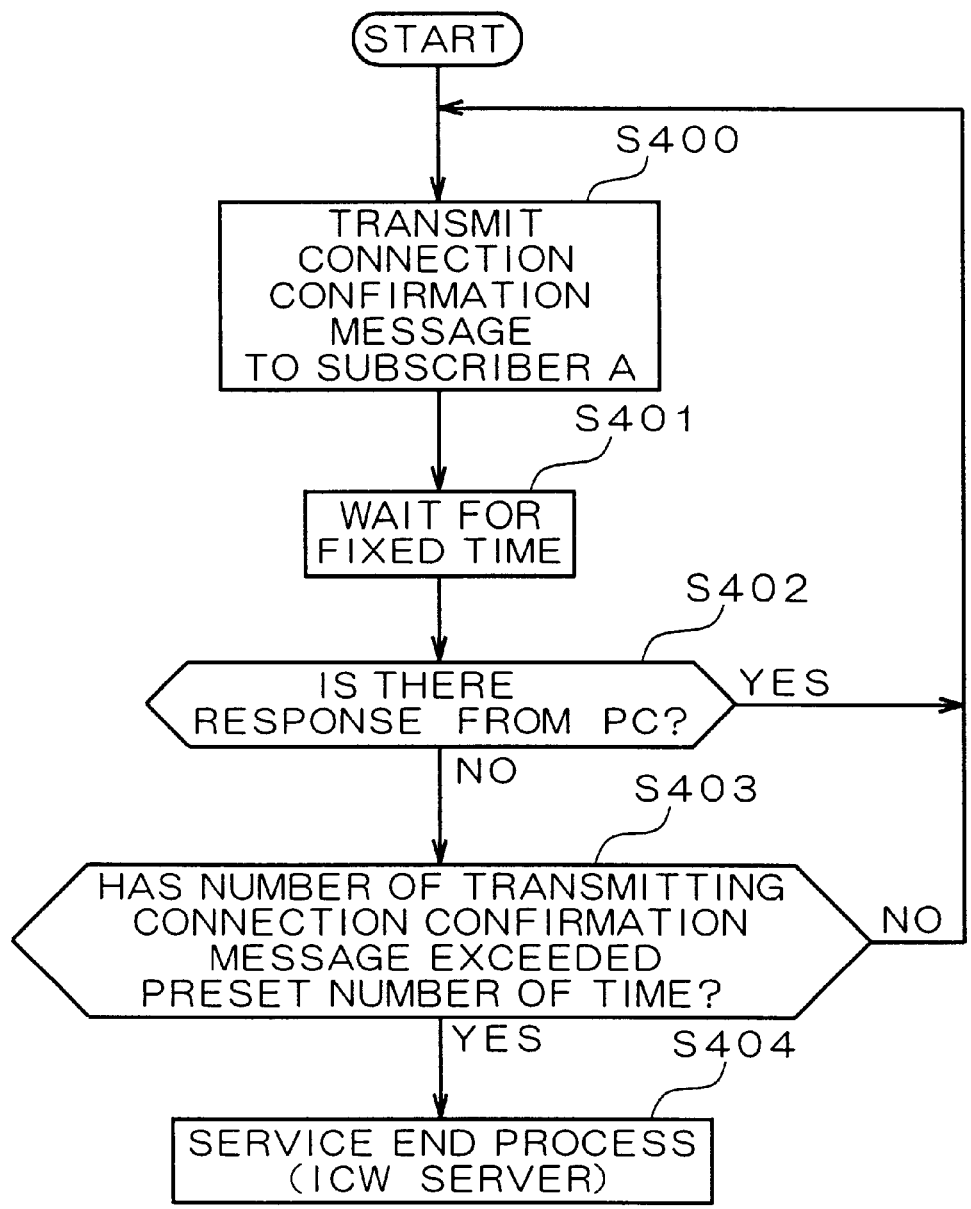
FIG. 9 is a flowchart showing the operation procedure of a communication disabled determination process in the ICW server.

FIG. 9 is a flowchart showing the operation procedure of the communication disabled determination process in the ICW server 140. The control unit 142 within the ICW server 140 transmits a connection confirmation message to the subscriber A (step S400), waits for a fixed time (step S401), and makes a determination whether or not there is a response from the PC 200 of the subscriber A (step S402). If there is any response, an affirmative determination is made, and the operation following the transmission of a connection confirmation message at step S400 is repeated.

If no response is returned from the PC 200 of the subscriber A after waiting for a fixed time, a negative determination is made at step S402. Then the control unit 142 makes a determination whether or not the number of transmitting the connection confirmation message has exceeded a preset number of times (step S403). If not exceeded, a negative determination is made, and the operation following the transmission of the connection confirmation message at step S400 is repeated until the preset number of times is exceeded. If no response to this confirmation message is returned from the subscriber A after transmitting this connection confirmation message beyond the preset number of times, an affirmative determination is made at step S403. This state corresponds to a communication disabled state between the PC 200 of the subscriber A and the ICW server 140. Then the routine transfers to a service end process at step S104 as shown in FIG. 5.

Figure 10:
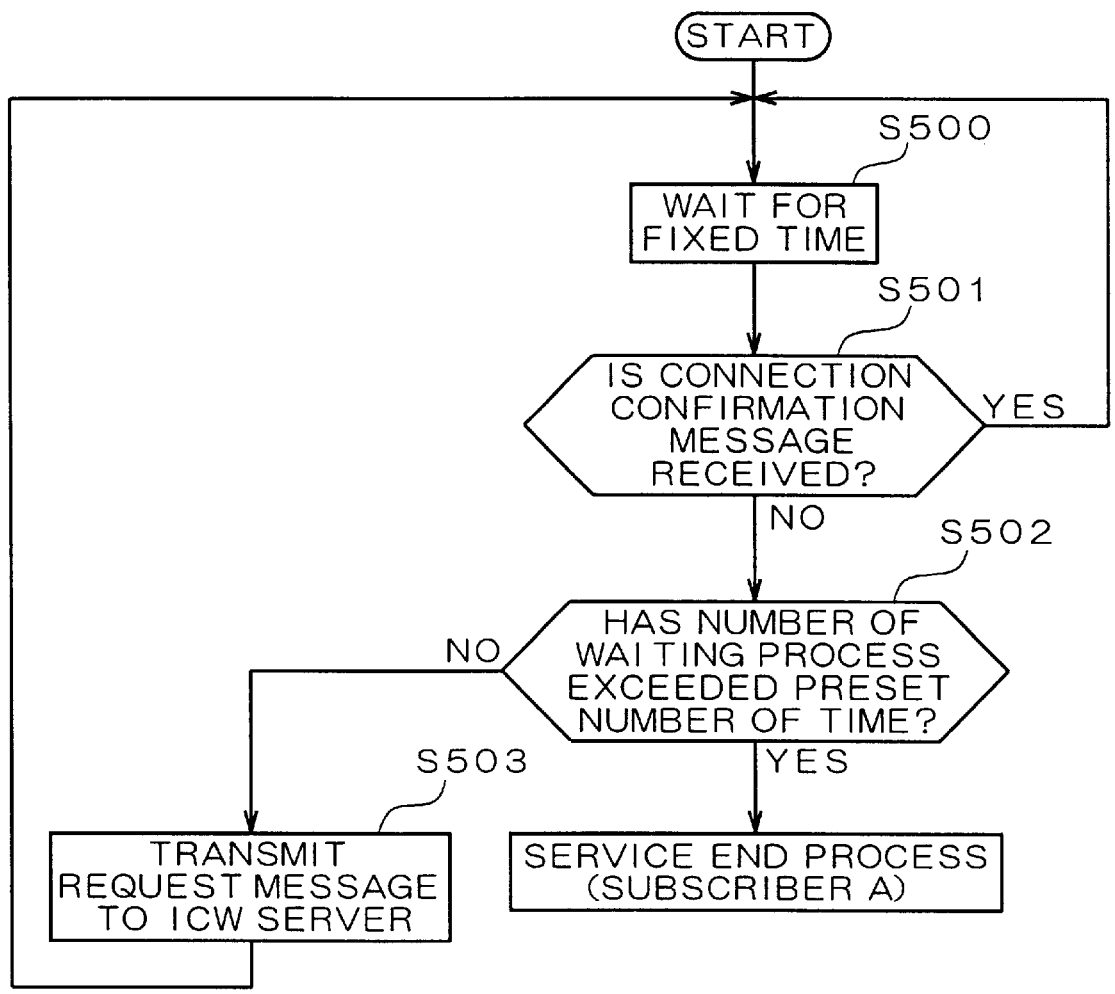
FIG. 10 is a flowchart showing the operation procedure of the communication disabled determination process at a PC of the subscriber.

FIG. 10 is a flowchart showing the operation procedure of the communication disabled determination process at the PC 200 of the subscriber A. The PC 200 waits for a fixed time (step S500), and then makes a determination whether or not a connection confirmation message from the ICW server 140 has been received (step S501). If the connection confirmation message has been received, an affirmative determination is made, and the operation following the waiting process at step S500 is repeated.

If the connection confirmation message from the ICW server 140 is not received within a fixed time, a negative determination is made at step S501. Then the PC 200 makes a determination whether or not the number of performing the waiting process at step S500 due to receiving no connection confirmation message has exceeded a preset number of times (step S502). If not exceeded, a negative determination is made, and then the PC 200 transmits a request message to the ICW server 140 (step S503). Then the operation following the waiting process for a fixed time at step S500 is repeated. The ICW server 140 transmits a connection confirmation message immediately after it has accepted the request message.

If the number of performing the waiting process at step S500 due to receiving no connection confirmation message has exceeded a preset number of times, an affirmative determination is made at step S502. This state corresponds to a communication disabled state between the PC 200 of the subscriber A and the ICW server 140. Subsequently the routine transfers to a service end process at step S104 as shown in FIG. 5.

Service end Process

A service end process (step S104 in FIG. 5) will be described below, wherein the service end process is performed when the communication between the ICW server 140 and the PC 200 of the subscriber A is disabled, or when the use of the ICW service is ended with the will of the subscriber A.

Figure 11:
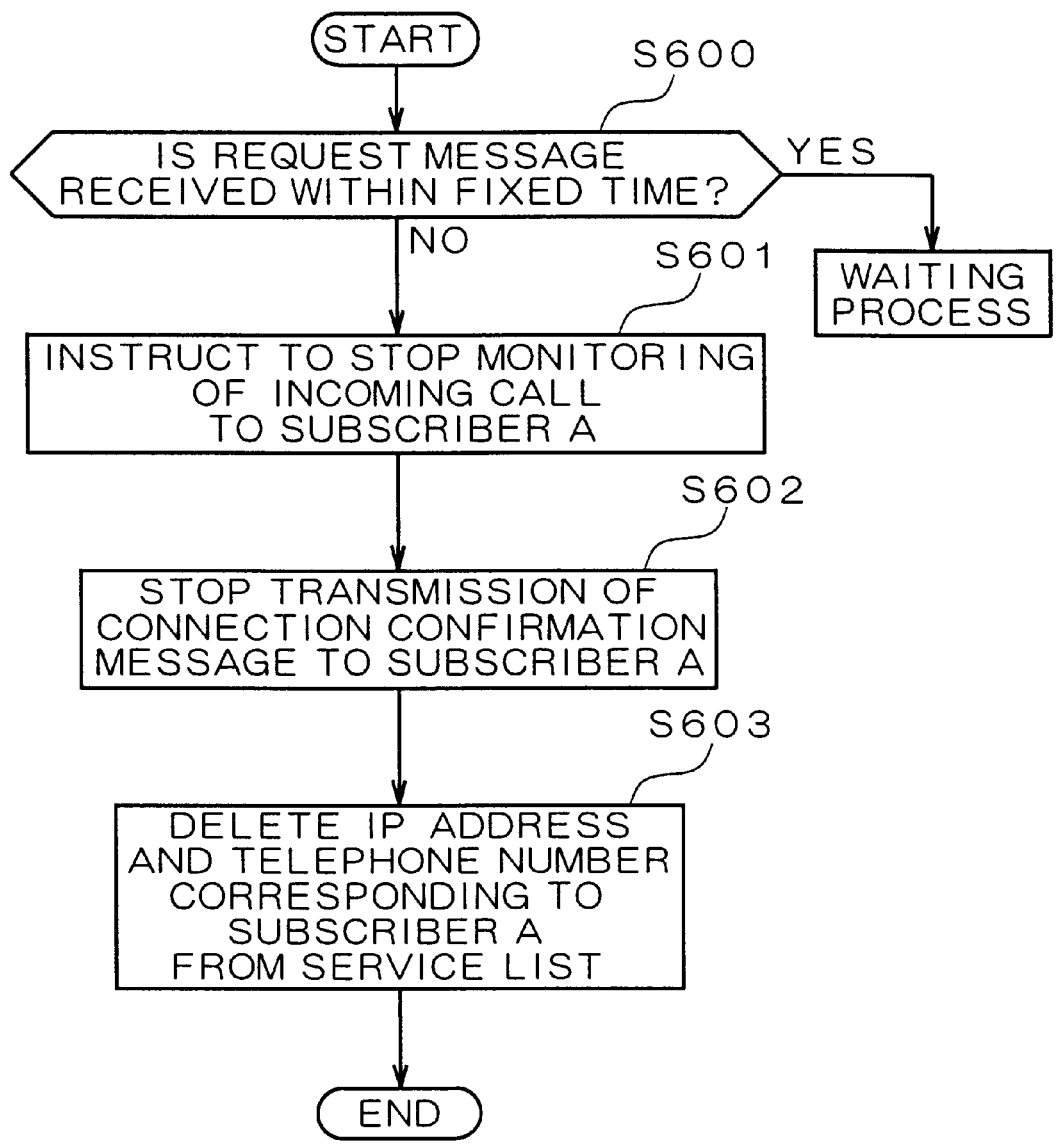
FIG. 11 is a flowchart showing the operation procedure of a service termination process in the ICW server.

FIG. 11 is a flowchart showing the operation procedure of the service end process due to communication disabled at the ICW server 140. The control unit 142 within the ICW server 140 makes a determination whether or not a request message from the PC 200 of the subscriber A has been received within a fixed time after starting the service end process (step S600). For example, if a request message is transmitted from the PC 200 to the ICW server 140 at step S503 as shown in FIG. 10, an affirmative determination is made at step S600, where the ICW server 140 performs successively the waiting process as shown in FIG. 5.

If no request message is received within a fixed time, a negative determination is made at step S600. Then the control unit 142 transmits an instruction of stopping the monitoring of an incoming call to the subscriber A to the CA 160 (step S601). Also, the control unit 142 stops the transmission of a connection confirmation message to the subscriber A (step S602), and deletes the IP address and the telephone number corresponding to the subscriber A from the service list stored in the storage unit 144 (step S603). In this way, the service end process which is performed in the ICW server 140 is terminated. When the service end process is performed with the will of the subscriber A, the control unit skips the step S600 and performs step S601 if the ICW server 140 receives a message for service end request from the subscriber A.

Figure 12:
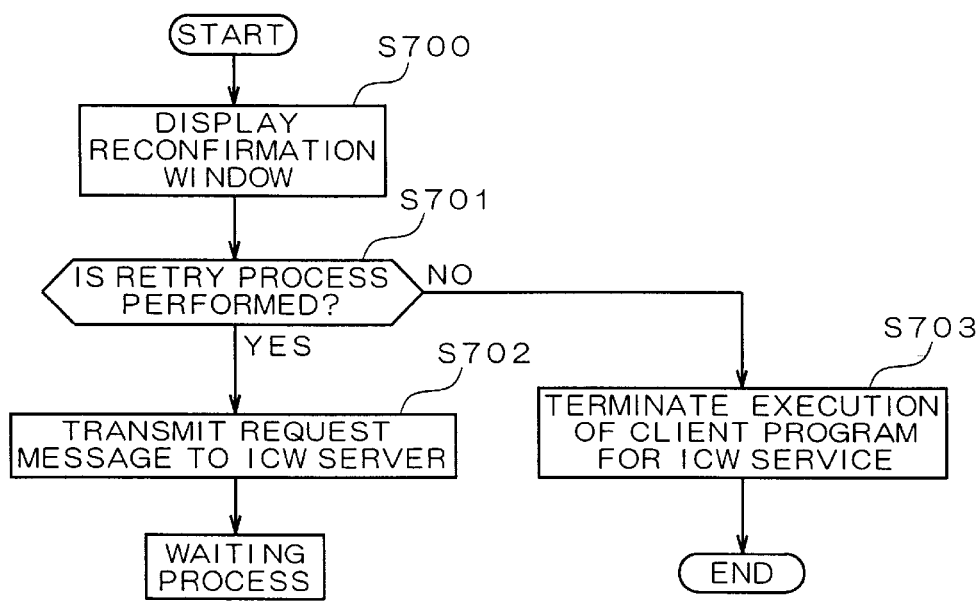
FIG. 12 is a flowchart showing the operation procedure of the service termination process at a PC of the subscriber.

FIG. 12 is a flowchart showing the operation procedure of the service end process that is performed at the PC 200 of the subscriber A. First, the PC 200 displays a reconfirmation window containing a character string "Do you retry?" non a part of the screen (step S700), and then subscriber A makes a determination whether or not a retry process is performed (step S701). Here, the retry process is one in which a request message is transmitted to the ICW server 140 again in this state without continuing the service end process. If the execution of the retry process is instructed by the subscriber A operating a keyboard or a mouse equipped on the PC 200, an affirmative determination is made at step S701, and then the PC 200 transmits a request message to the ICW server 140 (step S702). Then the routine transfers to awaiting process.

If no execution of the retry process is instructed by the subscriber A, a negative determination is made at step S701. Then the PC 200 terminates the execution of a client program for the ICW service (step S703). In this way, the service end process which is performed at the PC 200 is terminated. If the service end process is performed with the will of the subscriber A, the PC 200 transmits a service end request message to the ICW server 140, and then performs the processing at step S703.

Incoming Call Notification Process in the ICW Service

An incoming call notification process (step S105 in FIG. 5) which is performed when the subscriber B makes a phone call to the subscriber A will be described below.

Figure 13:
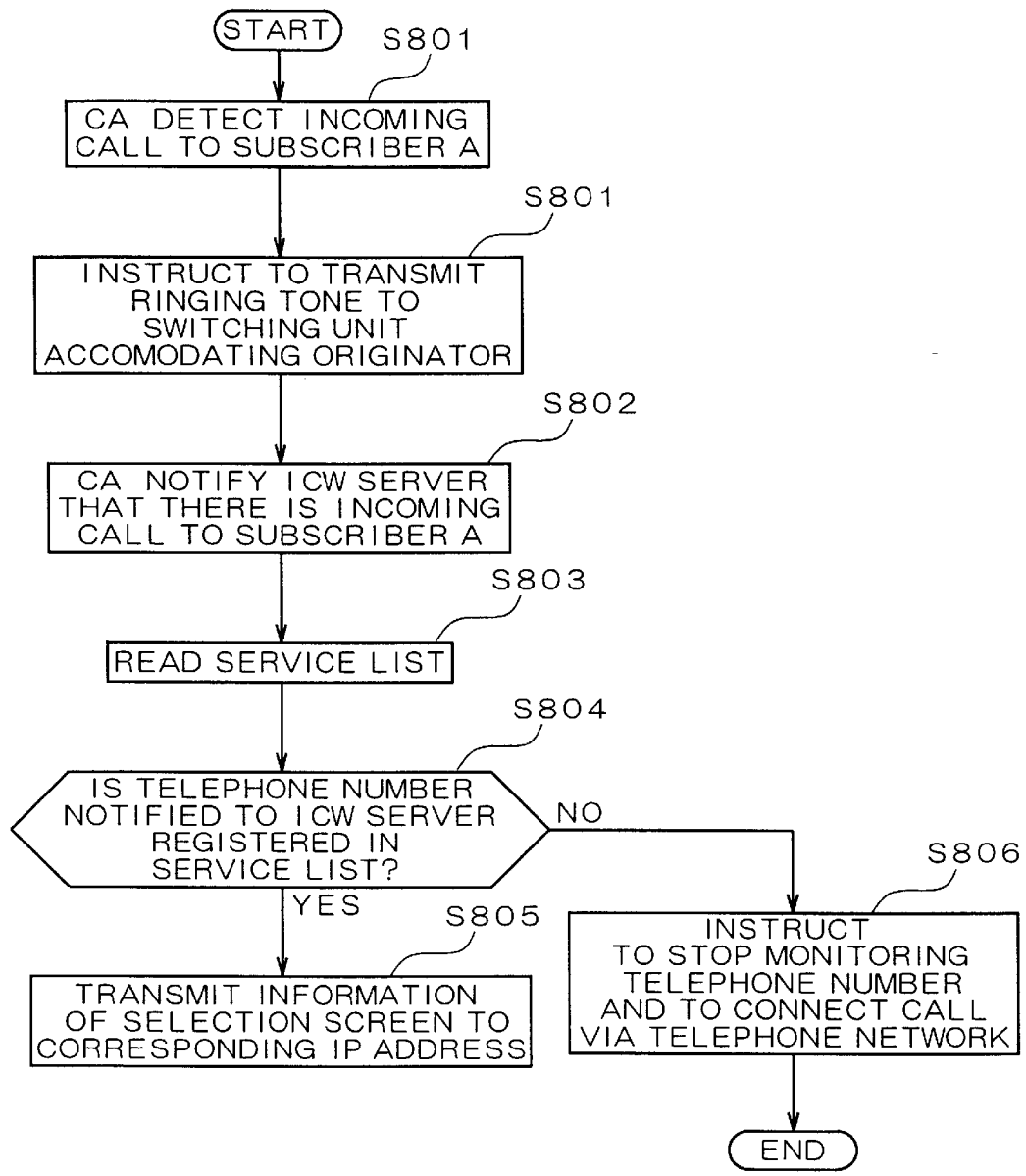
FIG. 13 is a flowchart showing the operation procedure of an incoming call notification process.

FIG. 13 is a flowchart showing the operation procedure of the incoming call notification process. The flowchart in the same figure includes the operation by the CA 160 and the operation by the ICW server 140.

The SCP functional unit 163 within the CA 160 detects an incoming call to the subscriber A from any other subscriber (step S800), and then instructs to transmit a ringing tone to a switching unit accommodating the originator (step S801). If the subscriber B is an originator, an instruction of transmitting a ringing tone to a telephone set 220 of the subscriber B is transmitted to the LS106 accommodating this telephone set 220. Also, the control unit 161 within the CA 160 notifies the ICW server 140 that there is an incoming call to the telephone number XXX-YYYY (subscriber A) (step S802). This notification also contains the telephone number ZZZ-WWWW of the subscriber B who is an originator.

The control unit 142 within the ICW server 140 which has received this notification reads a service list stored in the storage unit 144 (step S803), and then makes a determination whether or not the telephone number of the subscriber A who subscriber B called contained in this received notification is registered in the service list (step S804). When the telephone number of notice is registered in the service list, an affirmative determination is made, and then the control unit 142 transmits a message that there is a phone call from the subscriber with the telephone number ZZZ-WWWW and the information as to a selection screen containing the choices for the action to be taken to the PC 200 designated by the IP address corresponding to this telephone number and registered in the service list (step S805).

On the other hand, if the telephone number of notice is not registered in the service list, a negative determination is made at step S804. Then the control unit 142 transmits to the CA 160 an instruction of stopping the monitoring of an incoming call to the telephone number notified and connecting the call via the telephone network (step S806).

In this way, if the subscriber A who is using some services via the Internet 120 by making dial-up connection to the ISP 130 has a phone call from the other subscriber B, the CA 160 notifies the ICW server 140 that there is the phone call, and the choices for the action to be taken by the subscriber A are presented from the ICW server 140 to the PC 200 of the subscriber A. The procedure is placed in a waiting state for an instruction from the subscriber A.

A specific operation when selecting each of the choices contained in the selection screen that is transmitted from the ICW server 140 to the PC 200 of the subscriber A at step S805 will be described below. As described above, the selection screen in this embodiment contains five choices of (1) Reply via the Internet, (2) Reply with the ordinary telephone, (3) Transfer, (4) Use the voice mail function, and (5) Reject.

Replying Via the Internet

Figure 14:
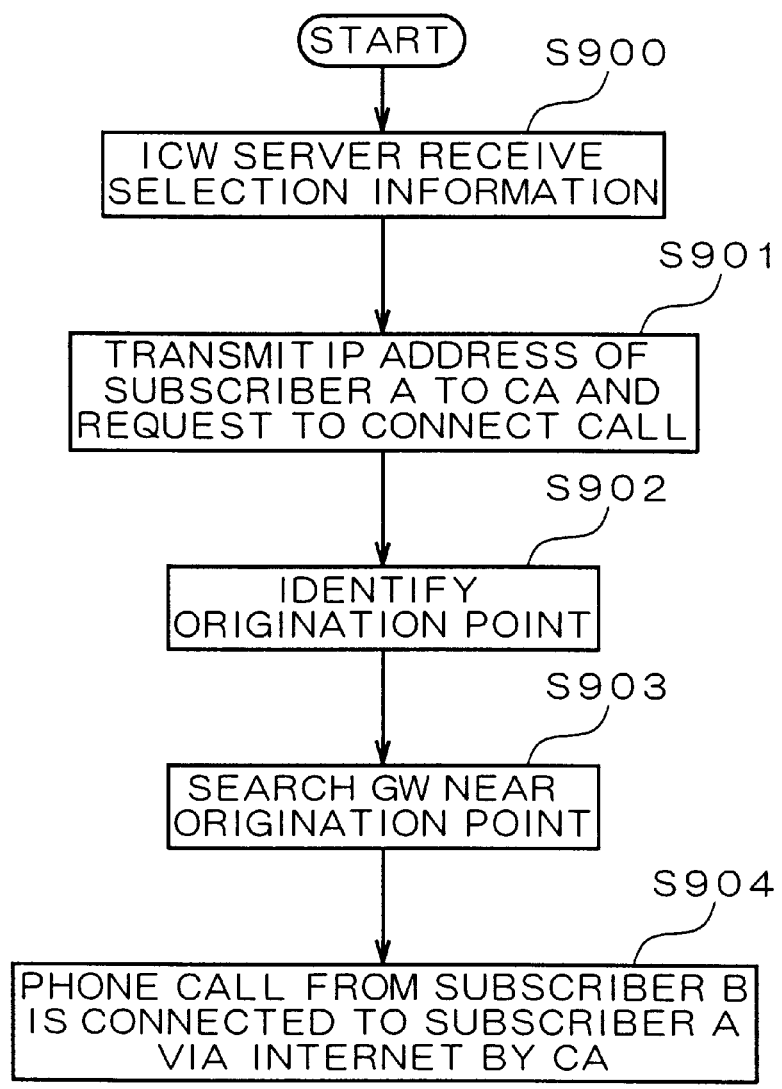
FIG. 14 is a flowchart showing the operation procedure when a subscriber A replies via the Internet.

FIG. 14 is a flowchart showing the operation procedure when the subscriber A makes a choice "Reply via the Internet" from among five choices contained in the selection screen. If the subscriber A makes a choice "Reply via the Internet," the selection information is transmitted from the PC 200 of the subscriber A to the ICW server 140, and the control unit 142 within the ICW server 140 receives this selection information via the IP network interface 146 (step S900).

Then the control unit 142 transmits IP address of the subscriber A and requests to the CA 160 to connect a call from the telephone number ZZZ-WWWW (subscriber B) (step S901). The control unit 161 within the CA 160 which has accepted this request identifies an origination point of the subscriber B, based on the telephone number ZZZ-WWWW of the subscriber B which is an originator (step S902). For example, the origination point of the subscriber B is identified, based on an area code contained in the telephone number (subscriber's number) of the subscriber B.

The control unit 142 searches for an available GW which is located near the origination point of the subscriber B (step S903). In the network of this embodiment, GW 152 is located nearest the subscriber B, as shown in FIG. 1, and discriminated by the retrieval. When the GW 152 located nearest the subscriber B is confused and congested, or when the GW 152 is not available due to some cause, the next nearest GW is searched.

The GW control unit 164 within the CA 160 controls the GW 152 to connect a phone call from the subscriber B to the subscriber A via the IP network (IP network 110, 112 and Internet 120. It is desirable that the connection is not via the poor managed public Internet 120) (step S904). Thereby, a voice signal transmitted from the telephone set 220 of the subscriber B is transmitted via the TN 102 to the GW 152. In the GW 152, the voice signal is converted into the IP packets, which are then transferred via the IP network 112, the Internet 120(the IP packets are desirably to be transferred to IP network 110 directly via a well managed back-bone line), the IP network 110, the ISP 130, and the AS 170 to the PC 200. The received IP packet received in the PC 200 is converted into the voice signal, which is then conveyed to a headphone 205. On the contrary, a voice signal sent from the microphone 206 of the subscriber A is converted into the IP packet in the PC 200. Then the IP packet is transferred via the dial-up session across TN 100, the AS 170, ISP 130, IP network 110, Internet 120 (desirably well managed backbone line between IP network 112 and IP network 110), IP network 112 to the GW 152, and converted again into the voice signal, which is then conveyed to the telephone set 220 of the subscriber B.

Replying with the Ordinary Telephone

Figure 15:
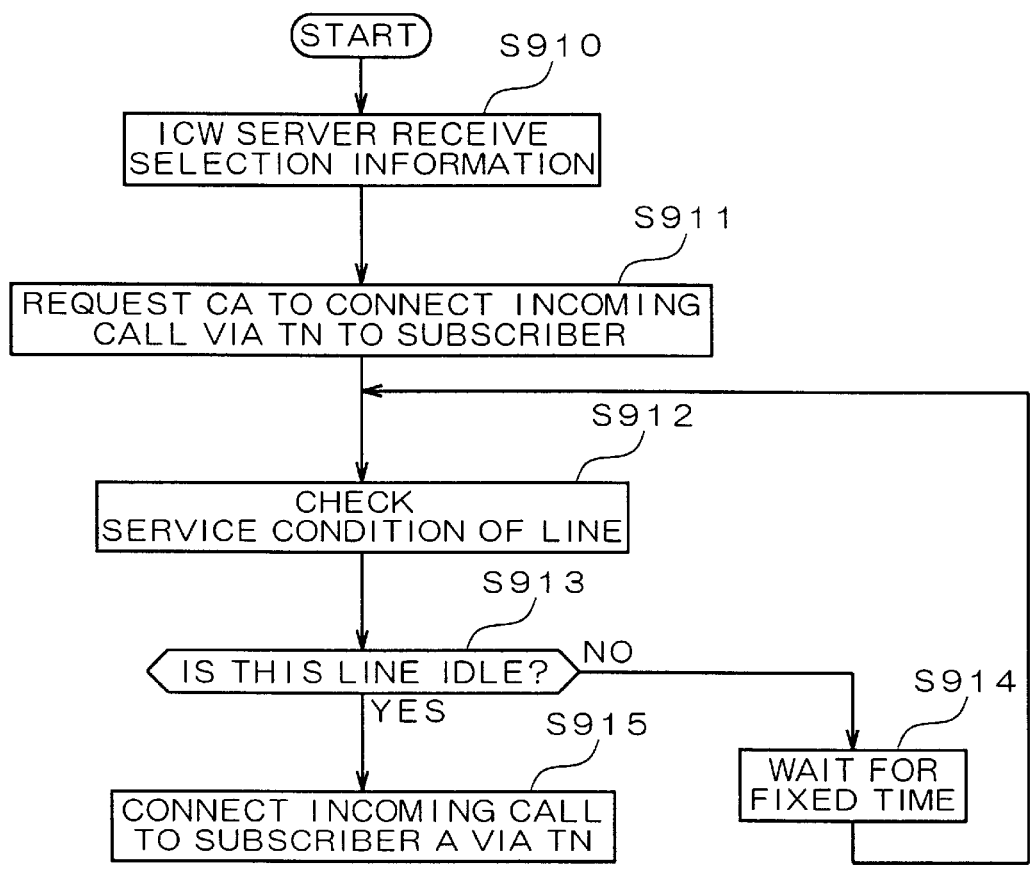
FIG. 15 is a flowchart showing the operation procedure of an ICW server and a CA when the subscriber A replies using an ordinary telephone but not via any IP network.

FIG. 15 is a flowchart showing the operation procedure of the ICW server 140 and the CA 160 when replying with the ordinary telephone via the TN 100, 102 but not via the Internet 120. If the subscriber A makes a choice "Reply not via the Internet," the selection information, is transmitted from the PC 200 of the subscriber A to the ICW server 140, and the control unit 142 within the ICW server 140 receives this selection information (step S910).

The control unit 142 requests the CA 160 to connect an incoming call not via the Internet 120 but via the TN 100, 102 to the subscriber A (step S911). Thereafter, the PC 200 automatically logs off the ISP 130 by the ICW service client software, terminates a PPP (Point to Point Protocol) session established with the AS 170, and once disconnects the line.

If this request is accepted, the SCP functional unit 163 within the CA 160 checks the service condition of the line for the subscriber A (step S912), and then makes a determination whether or not the line is idle (step S913). If not idle, a negative determination is made, and the procedure waits for a fixed time (step S914). Subsequently, the operation following the step S912 for checking the service condition of the line is repeated.

If the line of the subscriber A is idle, an affirmative determination is made at step S913, and the SCP functional unit 163 connects an incoming call via the TN 100, 102 to the telephone set 204 of the subscriber A (step S915). Thereby, the telephone set 204 of the subscriber A and the telephone set 220 of the subscriber B are connected via the TN 100, 102 but not via the IP network such as the Internet 120.

Figure 16:
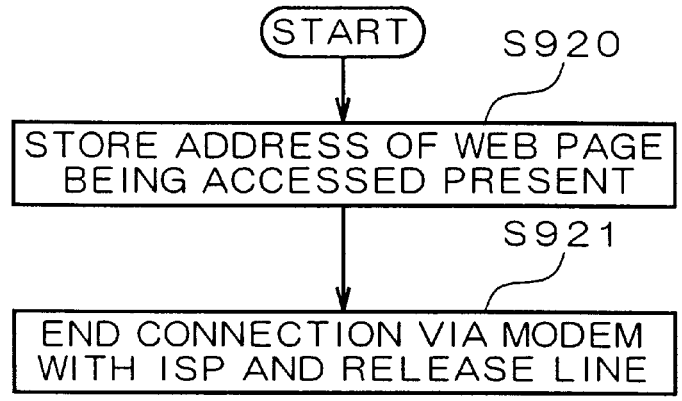
FIG. 16 is a flowchart showing the operation procedure of a PC of the subscriber when the subscriber A replies using an ordinary telephone but not via any IP network.

FIG. 16 is a flowchart showing the operation procedure of the PC 200 of the subscriber A when replying with the ordinary telephone 204 not via the Internet 120 but via the TN 100, 102. If the subscriber A makes a choice "Reply not via the Internet" by operating a mouse or keyboard, the PC 200 transmits the selection information to the ICW server 140, and then stores the address (e.g., URL) of a Web page being accessed at present in the storage unit (not shown) (step S920). Subsequently, the PC 200 terminates the state of connection via the modem 202 with the ISP 130, and frees the line of the subscriber A (step S921). Thereafter, the telephone set 204 of the subscriber A and the telephone set 220 of the subscriber B are connected via the TN 100, 102, using this idle line.

Making Other Choices

A case where any one of other three choices of "Transfer," "Use the voice mail function" and "Reject" is made will be described below.

Figure 17:
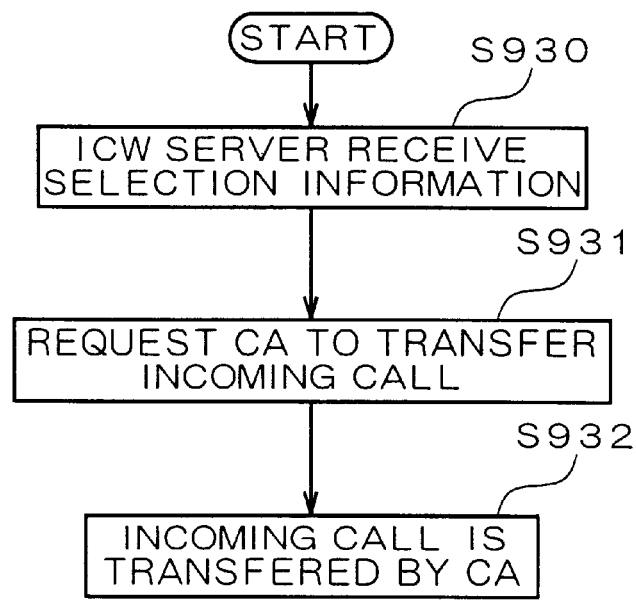
FIG. 17 is a flowchart showing the operation procedure when a call is transferred.

FIG. 17 is a flowchart showing the operation procedure when the subscriber A makes a choice "Transfer" from the five choices contained in the selection screen. When the subscriber A makes a choice "Transfer," the selection information is transmitted from the PC 200 of the subscriber A to the ICW server 140, and the control unit 142 within the ICW server 140 receives this selection information (step S930). Then, the control unit 142 requests the CA 160 to transfer the incoming call from subscriber B to the telephone number designated by the subscriber A (step S931). The SCP functional unit 163 within the CA 160 accepts this request, and then transfers the call from the subscriber B to the designated telephone number (step S932).

Figure 18:
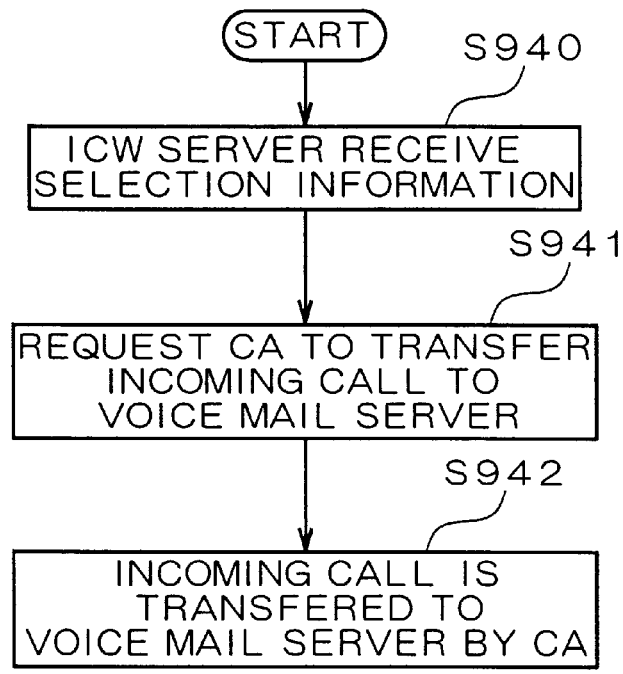
FIG. 18 is a flowchart showing the operation procedure when a voice mail function is used.

FIG. 18 is a flowchart showing the operation procedure when the subscriber A makes a choice "Use the voice mail function" from the five choices contained in the selection screen. When the subscriber A makes a choice "Use the voice mail function," the selection information is transmitted from the PC 200 of the subscriber A to the ICW server 140, and the control unit 142 within the ICW server 140 receives this selection information (step S940). Then, the control unit 142 requests the CA 160 to transfer a call from the subscriber B to the voice mail server 180 (step S941). If this request is accepted, the SCP functional unit 163 within the CA 160 transfers a call from the subscriber B to the voice mail server 180 (step S942). Thereby, the voice of the subscriber B is recorded as a voice mail.

Figure 19:
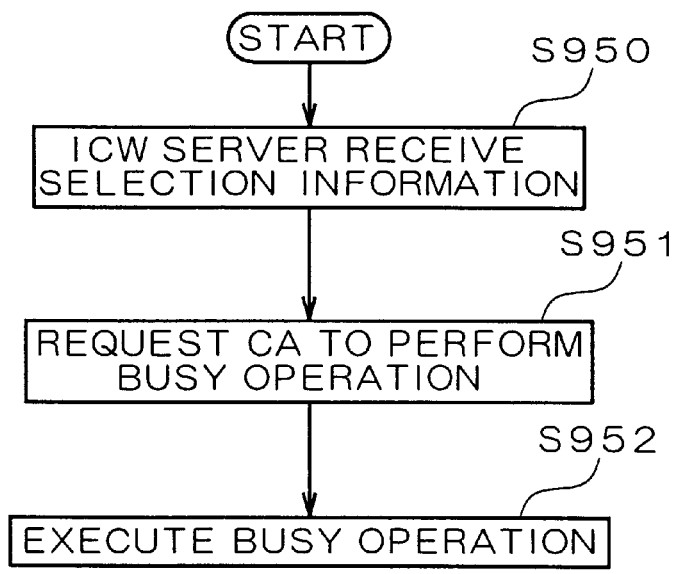
FIG. 19 is a flowchart showing the operation procedure when a response is rejected.
Figure 20:
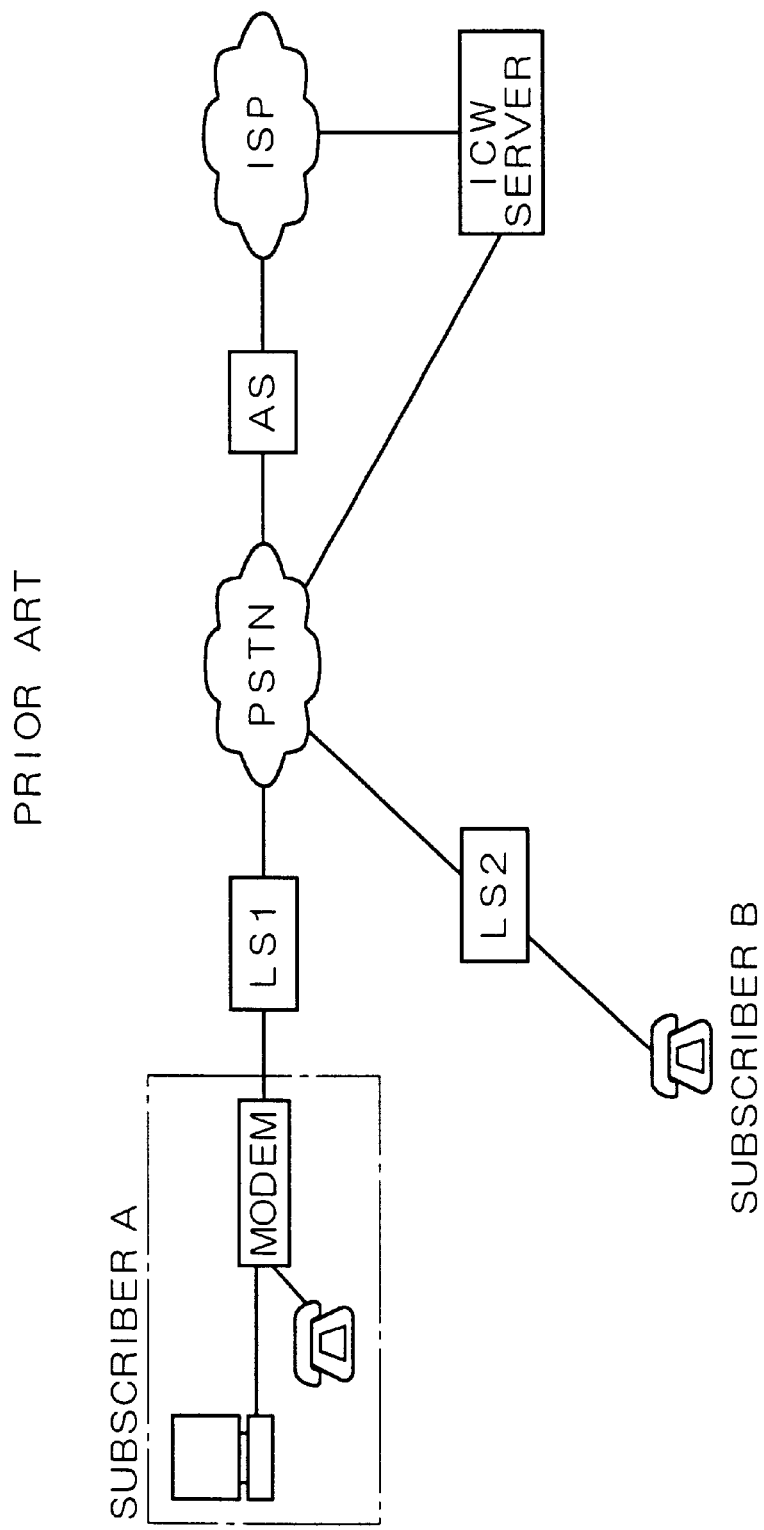
FIG. 20 is a block diagram of a network through which a conventional ICW service is provided.
Figure 21:
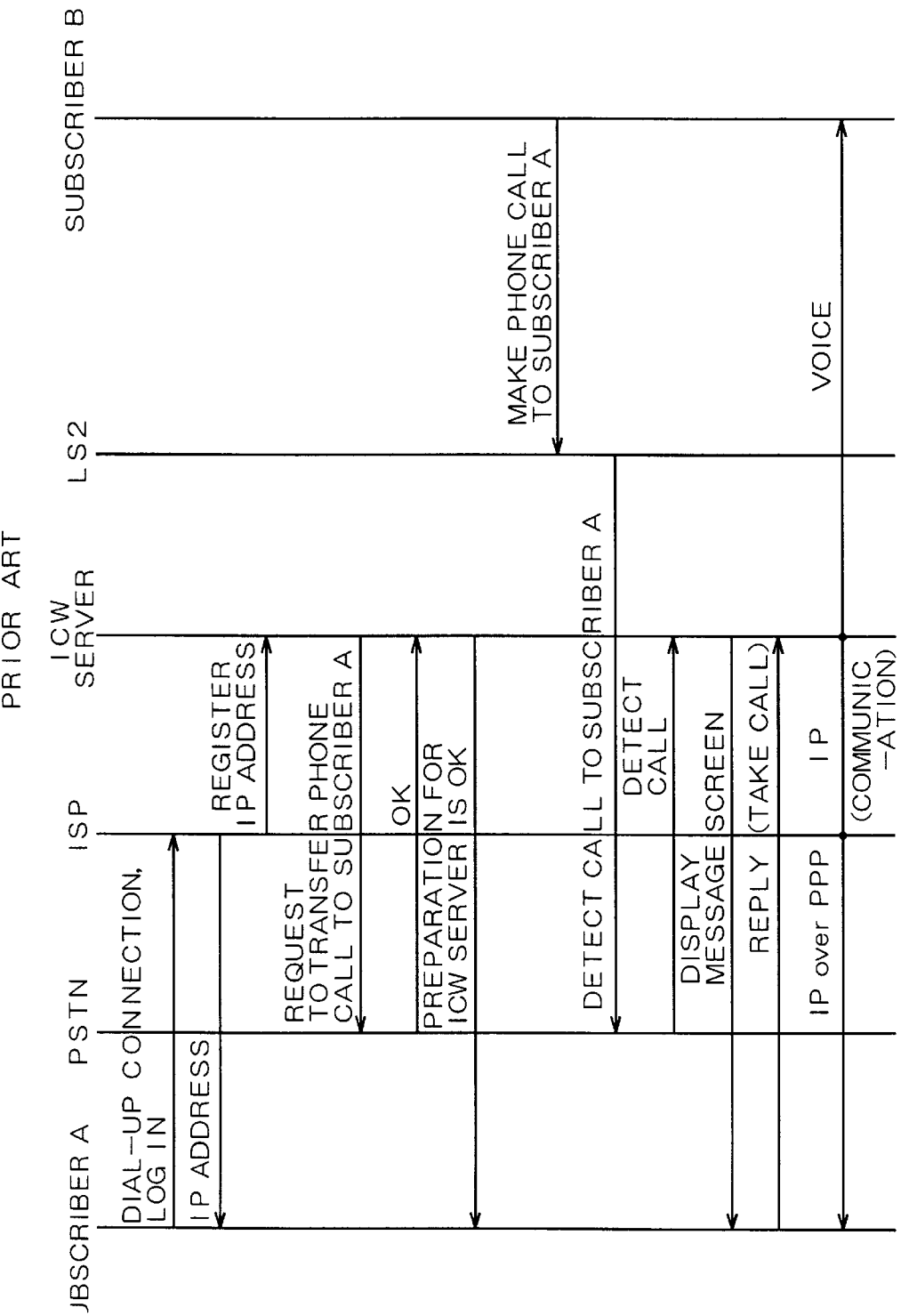
FIG. 21 is a diagram showing the procedure from a time when the subscriber A makes a dial-up connection to the Internet to a time when the subscriber A makes communication with the other subscriber B.

FIG. 19 is a flowchart showing the operation procedure when the subscriber A makes a choice "Reject" from the five choices contained in the selection screen. If the subscriber A makes a choice "Reject," the selection information is transmitted from the PC 200 of the subscriber A to the ICW server 140, and the control unit 142 within the ICW server 140 receives this selection information (step S950). Then, the control unit 142 requests the CA 160 to perform a busy operation for the call from the subscriber B (step S951). If this request is accepted, the SCP functional unit 163 within the CA 160 transfers an instruction to the LS 106 to send a busy signal to the subscriber B (step S952). Thereby, the subscriber A can reject a reply to the phone call from the subscriber B.

In this way, in the network telephone system of this embodiment, a registration process can be effected in such a way that the PC 200 of the subscriber A transmits the information necessary for the ICW service such as the IP address to the ICW server 140. Accordingly, this registration process does not depend on the ISP to which the subscriber A has subscribed, and the user can make use of the telephone service via the IP network such as telephone service carriers IP network 110 and 112, or the Internet 120, whichever ISP the subscriber uses.

In the network telephone system of this embodiment, the GW available to the CA 160 and located nearest the origination point of the subscriber B is searched. The subscriber B only needs to pay for the telephone charge to the GW located nearest the subscriber B and the usage fee of the IP network (which is greatly cheaper than the telephone line). Therefore, the telephone charge can be greatly reduced as compared with the conventional case where the call is always transferred to the set site of the ICW server.

Also in the network telephone system of this embodiment, the subscriber A can reply to a phone call from the subscriber B only via the TN 100, 102 but not via the IP network such as the Internet 120. Since the release or reconnection of the necessary line is automatically performed, the time and labor required conventionally for this can be eliminated.

The present invention is not limited to the above-described embodiment, and may be subjected to a variety of modifications or variations within the scope or spirit of the invention. For example, in the above embodiment, the PC 200 of the subscriber A is connected to the Internet via a dial-up connection across the TN 100 using the modem 202, but the terminal may be used, instead of the modem, to connect the PC 200 or the telephone set 204, 220 to the Internet 120 via ISDN (Integrated Services Digital Network), or connect to the Internet 120 via a PPP session across the TN 100 using an XDSL (X Digital Subscriber Line) modem, etc.

In the above embodiment, the ICW server 140 is installed by connecting to the IP network 110, but this ICW server 140 maybe installed at any position over the network. For example, it maybe installed within the CA 160, or installed by connecting to the Internet 120.

The CA 160 is necessary to be connected to the signaling network of PSTN, but it is more desirable to be connected to the IP network 110, 112, than to be connected to the public internet 120.

What is claimed is:

1. A network telephone system, comprising:

service providing unit for providing a predetermined service via a network to a first subscriber who has made a dial-up connection;

subscriber information registration unit for registering subscriber information necessary to monitor a call to said first subscriber in response to a request of call transfer from said first subscriber who has made the dial-up connection;

incoming call detection unit for detecting that there is an incoming call from a second subscriber to said first subscriber who is making the dial-up connection to said service providing unit, by monitoring the call to said first subscriber based on said subscriber information registered in said subscriber information registration unit;

incoming call notification unit for notifying said first subscriber that an incoming call has been detected by said incoming call detection unit; and call control unit for controlling a call setup for voice between said first subscriber and said second subscriber, upon an instruction from said first subscriber who has received a notification by said incoming call notification unit, wherein said network includes a first network accommodating the lines for said first and second subscribers and having a service quality which does not vary depending on the traffic volume or the number of hops in the path of the connection with respect to the voice, a second network having a service quality which varies depending on the traffic volume or the number of hops in the path of the connection with respect to the voice, a plurality of protocol conversion unit, installed at a plurality of sites, for converting the protocol between said first and second networks, and said call control unit makes the call setup for voice via said first and second networks, wherein said call control unit designates said protocol conversion unit available which is located near the residential place of the second subscriber, and makes a call setup between said first subscriber and said second subscriber via said designated protocol conversion unit.

2. The network telephone system according to claim 1, wherein said call control unit designates said protocol conversion unit near the residential place of the second subscriber, based on said subscriber's number specified in correspondence to said second subscriber.

* * * * *